United States Patent
Sakata et al.

(10) Patent No.: US 9,228,522 B2
(45) Date of Patent: Jan. 5, 2016

(54) SUPERCHARGER-EQUIPPED INTERNAL COMBUSTION ENGINE

(75) Inventors: Kunihiko Sakata, Toyota (JP); Akihiro Ikeda, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 57 days.

(21) Appl. No.: 13/979,703

(22) PCT Filed: Jan. 18, 2011

(86) PCT No.: PCT/JP2011/050752
§ 371 (c)(1),
(2), (4) Date: Jul. 15, 2013

(87) PCT Pub. No.: WO2012/098644
PCT Pub. Date: Jul. 26, 2012

(65) Prior Publication Data
US 2013/0283787 A1    Oct. 31, 2013

(51) Int. Cl.
| | |
|---|---|
| F02B 33/44 | (2006.01) |
| F02D 41/22 | (2006.01) |
| F02D 41/00 | (2006.01) |
| F02D 41/14 | (2006.01) |
| F01N 11/00 | (2006.01) |
| F01N 13/10 | (2010.01) |
| F02B 37/02 | (2006.01) |

(52) U.S. Cl.
CPC ............ *F02D 41/22* (2013.01); *F02D 41/0007* (2013.01); *F02D 41/1443* (2013.01); *F02D 41/1456* (2013.01); *F01N 11/007* (2013.01); *F01N 13/107* (2013.01); *F01N 2560/025* (2013.01); *F01N 2560/14* (2013.01); *F02B 37/025* (2013.01); *Y02T 10/144* (2013.01)

(58) Field of Classification Search
CPC ................ F01N 11/007; F01N 13/107; F01N 2560/025; F01N 2560/14; F02B 37/025; F02D 41/0007; F02D 41/1443; F02D 41/1456; F02D 41/22; Y02T 10/144
See application file for complete search history.

(56) References Cited

U.S. PATENT DOCUMENTS

| | | | | |
|---|---|---|---|---|
| 5,954,039 A | * | 9/1999 | Doering et al. ................ | 123/692 |
| 6,543,219 B1 | * | 4/2003 | Surnilla .......................... | 60/285 |
| 7,027,910 B1 | * | 4/2006 | Javaherian et al. ........... | 701/111 |
| 8,401,766 B2 | * | 3/2013 | Iwazaki et al. ................ | 701/109 |

(Continued)

FOREIGN PATENT DOCUMENTS

| | | |
|---|---|---|
| JP | 62-162349 U | 10/1987 |
| JP | 2003-301720 A | 10/2003 |

(Continued)

*Primary Examiner* — Jesse Bogue
(74) *Attorney, Agent, or Firm* — Dinsmore & Shohl LLP

(57) ABSTRACT

In a multicylinder internal combustion engine including a turbocharger, the turbocharger employs a twin-entry turbo where a turbine includes two exhaust gas inflow ports. A first exhaust passage guides an exhaust gas discharged from a first cylinder group of the internal combustion engine to one exhaust gas inflow port of the turbocharger. A second exhaust passage guides an exhaust gas discharged from a second cylinder group of the internal combustion engine to the other exhaust gas inflow port of the turbocharger. An exhaust gas collecting portion of the first exhaust passage and an exhaust gas collecting portion of the second exhaust passage each include an air-fuel ratio sensor. This configuration allows efficiently contact of the exhaust gas on an element portion of the air-fuel ratio sensor, thus accurately detecting an air-fuel ratio of the exhaust gas at an upstream side of a catalyst for each cylinder.

3 Claims, 5 Drawing Sheets

(56) References Cited

U.S. PATENT DOCUMENTS

2003/0209235 A1* 11/2003 Javaherian ............... 123/674
2010/0126156 A1* 5/2010 Diez et al. ................ 60/323
2010/0170460 A1* 7/2010 Leone et al. ............. 123/90.16
2011/0153181 A1* 6/2011 Bagnasco et al. .......... 701/109
2011/0302917 A1* 12/2011 Styles et al. ............... 60/602

FOREIGN PATENT DOCUMENTS

| JP | 2007-032476 A | 2/2007 |
| JP | 2007-247409 A | 9/2007 |
| JP | 2009-270543 A | 11/2009 |
| JP | 2009-281328 A | 12/2009 |
| JP | 2010-209682 A | 9/2010 |

* cited by examiner

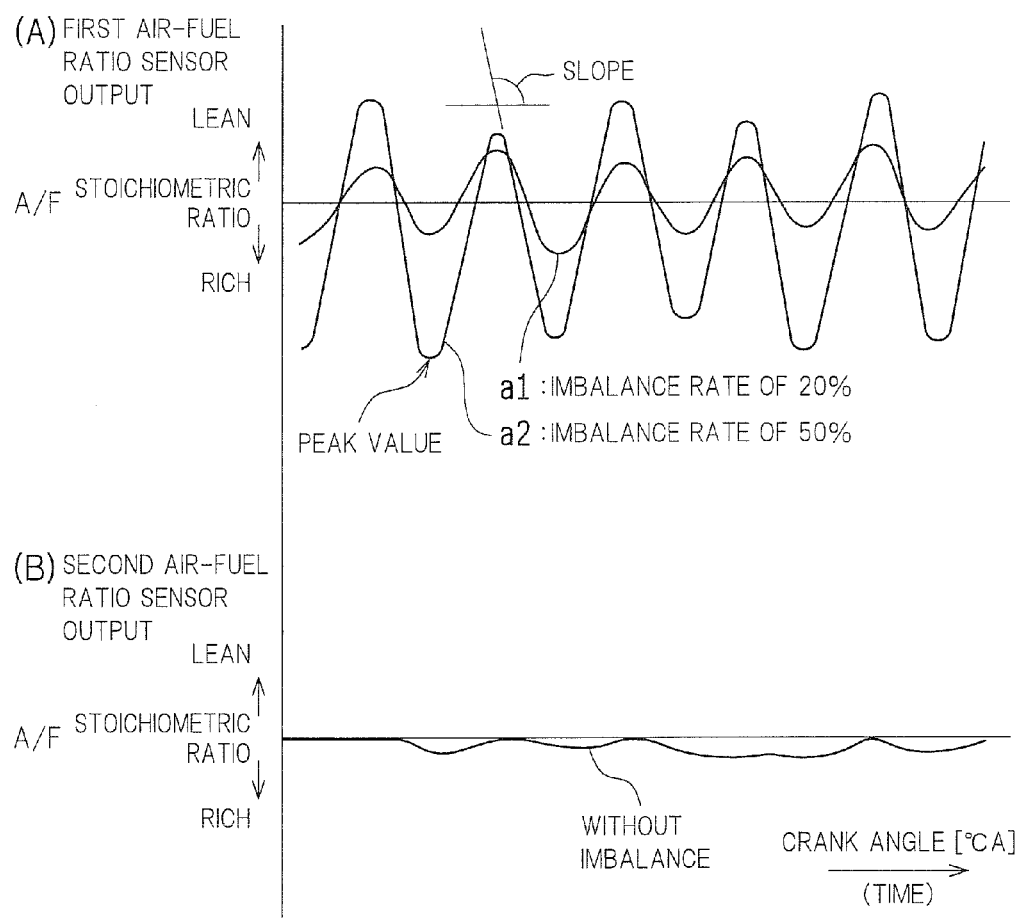

SUPERCHARGER-EQUIPPED INTERNAL COMBUSTION ENGINE

TECHNICAL FIELD

The present invention relates to a supercharger-equipped internal combustion engine, more specifically, to a supercharger-equipped multicylinder internal combustion engine that includes an air-fuel ratio sensor to detect an air-fuel ratio of exhaust gas.

BACKGROUND ART

In an internal combustion engine (hereinafter also referred to as an engine) mounted on an automobile or similar vehicle, an amount (a fuel injection amount) of fuel to be injected from an injector (a fuel injection valve) is feedback-controlled (air-fuel ratio feedback control) based on a deviation between an air-fuel ratio (an actual air-fuel ratio) detected by an air-fuel ratio sensor disposed at an exhaust passage and a target air-fuel ratio (such as an ideal air-fuel ratio). Performing this air-fuel ratio feedback control allows accurate control of the air-fuel ratio, and improves exhaust emission.

Incidentally, in a multicylinder internal combustion engine that includes a plurality of cylinders, an air-fuel ratio control is usually performed on all cylinders using the same control variable. Accordingly, even if the air-fuel ratio control is performed, the actual air-fuel ratio may be varied among the cylinders (A/F imbalance). In the case where the degree of the variation in air-fuel ratio is small, the air-fuel ratio feedback control can absorb the variation. Additionally, a catalyst can also purify a harmful component in exhaust gas. Therefore, this does not affect the exhaust emission, and is not particularly problematic. However, for example, in the case where a fuel injection system in a part of the plurality of cylinders of the internal combustion engine breaks down and the air-fuel ratios among the cylinders vary considerably, the exhaust emission becomes deteriorated (for example, see Patent Literature 1). From this aspect, in the field of automobiles, in order to prevent running in a state of deteriorated exhaust gas, detection of abnormal air-fuel ratio variation (A/F imbalance) among the cylinders in a vehicle (OBD: On Board Diagnosis) has been defined by law.

In contrast, in the internal combustion engine mounted on the automobile and similar vehicle, a supercharger (hereinafter also referred to as a turbocharger) using energy of exhaust air is equipped. The turbocharger generally includes a turbine wheel, a compressor impeller, and a coupling shaft. The turbine wheel rotates by exhaust gas flowing through the exhaust passage of the internal combustion engine. The compressor impeller forcibly sends air inside of an intake passage into a combustion chamber of the engine. The coupling shaft couples the turbine wheel and the compressor impeller together. In the turbocharger with this structure, the turbine wheel disposed at the exhaust passage rotates by energy from the exhaust air. Along with this rotation, the compressor impeller disposed at the intake passage rotates to supercharge intake air. Subsequently, the supercharged air is forcibly sent into the combustion chamber of each cylinder in the engine.

As a turbocharger, a twin-entry turbocharger (for example, see Patent Literature 2 and 3) that includes two exhaust gas inflow ports at the turbine (the turbine housing) is known. This twin-entry turbocharger is employed in order to prevent mutual interference of exhaust gas pulsations in the multicylinder internal combustion engine, to ensure high output power, and similar purpose. A multicylinder internal combustion engine (a supercharger-equipped multicylinder internal combustion engine) with the twin-entry turbocharger is configured as follows. A plurality of cylinders are divided into cylinder groups where respective exhaust strokes are not adjacent to one another. Exhaust gas for each cylinder group is independently guided to the exhaust gas inflow port of the turbine.

CITATION LIST

Patent Literature

Patent Literature 1: Japanese Unexamined Patent Application Publication No. 2009-281328
Patent Literature 2: Japanese Unexamined Patent Application Publication No. 2007-32476
Patent Literature 3: Japanese Unexamined Utility Model Application Publication No. S62-162349

SUMMARY OF INVENTION

Technical Problem

Incidentally, in the supercharger-equipped multicylinder internal combustion engine, an air-fuel ratio sensor (an A/F sensor) for detecting an air-fuel ratio of exhaust gas on an upstream side of a catalyst is disposed between the turbine of the turbocharger and the catalyst. Accordingly, the exhaust gas to an element portion of the air-fuel ratio sensor is stirred at the turbocharger on the upstream side such that the air-fuel ratio is averaged. Thus, it becomes impossible to accurately detect the air-fuel ratio for each cylinder, which is concerned. If the detection of the air-fuel ratio for each cylinder is inaccurate, the above-described variation in air-fuel ratio among the cylinders cannot be accurately detected. This may be impermissible under OBD laws.

The present invention has been made in view of the above-described circumstances, and it is an object of the present invention to provide a supercharger-equipped internal combustion engine that accurately detects an air-fuel ratio of exhaust gas at an upstream side of a catalyst for each cylinder.

Solutions to the Problems

The present invention is premised on a supercharger-equipped internal combustion engine. The supercharger-equipped internal combustion engine includes a first exhaust passage, a second exhaust passage, and a supercharger (a twin-entry turbocharger). The first exhaust passage allows a flow of an exhaust gas discharged from a first cylinder group of an internal combustion engine with a plurality of cylinders. The second exhaust passage allows a flow of an exhaust gas discharged from a second cylinder group of the internal combustion engine. The supercharger includes a turbine and a compressor. The turbine includes two exhaust gas inflow ports. The first exhaust passage is coupled to one of exhaust gas inflow ports of the turbine. The second exhaust passage is coupled to the other exhaust gas inflow port of the turbine. This supercharger-equipped internal combustion engine has the following technical feature. A collecting portion that is the first exhaust passage at an upstream side (an upstream side of the flow of the exhaust gas) of the supercharger where exhaust gas from the first cylinder group is collected and flows and a collecting portion that is the second exhaust passage at an upstream side (an upstream side of the flow of the exhaust gas) of the supercharger where exhaust gas from the second cylinder group is collected and flows each include an air-fuel ratio sensor.

A specific configuration of the present invention includes the following configuration. The first exhaust passage is a first exhaust manifold that includes a plurality of branch pipes and a branch collecting portion. The branch pipes are coupled to respective exhaust ports in the first cylinder group. Downstream-side end portions of the plurality of branch pipes are coupled to an upstream-side end portion of the branch collecting portion. The branch collecting portion of the first exhaust manifold includes the air-fuel ratio sensor. The second exhaust passage is a second exhaust manifold that includes a plurality of branch pipes and a branch collecting portion. The branch pipes are coupled to respective exhaust ports in the second cylinder group. Downstream-side end portions of the plurality of branch pipes are coupled to an upstream-side end portion of the branch collecting portion. The branch collecting portion of the second exhaust manifold includes the air-fuel ratio sensor.

With the present invention, at the upstream side (the upstream side of the exhaust gas flow) of the supercharger, the air-fuel ratio sensor is disposed at the position (the branch collecting portion of the first exhaust manifold) after the respective exhaust gases from the plurality of cylinders (such as the first cylinder #1 and the fourth cylinder #4) in the first cylinder group are collected. The air-fuel ratio sensor is disposed at the position (the branch collecting portion of the second exhaust manifold) after the respective exhaust gases from the plurality of cylinders (such as the second cylinder #2 and the third cylinder #3) in the second cylinder group are collected. This allows the exhaust gas to properly collide with element portions of the respective air-fuel ratio sensors.

That is, in the case where the respective air-fuel ratio sensors are disposed for the first and second cylinder groups (such as the first cylinder and the fourth cylinder, and the second cylinder and the third cylinder), the locations of the air-fuel ratio sensors are simply determined considering respective flows (respective exhaust gas flows inside of the collecting portions of the first exhaust passage and the second exhaust passage) of the exhaust gases from the separate cylinder groups (the two cylinders) only. This provides high degree of freedom in location of the air-fuel ratio sensors. Thus, the respective element portions of the air-fuel ratio sensors can be disposed at positions (positions where the respective exhaust gases from the cylinders flow smoothly) that provide good collisions of the gases.

Additionally, the air-fuel ratio sensors at the first exhaust passage and the air-fuel ratio sensor at the second exhaust passage simply detect the air-fuel ratios of cylinders (such as the first cylinder and the fourth cylinder, and the second cylinder and the third cylinder) where the respective exhaust strokes are not adjacent to one another. Accordingly, compared with a case where one air-fuel ratio sensor is disposed for all the cylinders of the internal combustion engine, a time interval for detecting the exhaust gas air fuel ratio becomes longer (double). Thus, the respective outputs of the air-fuel ratio sensors for each cylinder can reliably be separated. Accordingly, it is possible to accurately detect the air-fuel ratio of the exhaust gas at the upstream side of the catalyst for each cylinder, thus accurately detecting the air-fuel ratio imbalance among the cylinders. As a result, the above-described detection of the air-fuel ratio imbalance among the cylinders is permitted under OBD laws.

With the present invention, the configuration detects whether or not an air-fuel ratio imbalance among the cylinders occurs based on respective outputs of the air-fuel ratio sensor disposed at the first exhaust passage and the air-fuel ratio sensor disposed at the second exhaust passage. A specific configuration in this case includes the following configuration. It is detected whether or not the air-fuel ratio imbalance among the cylinders occurs based on the respective output waveforms (such as slopes of sensor output waveforms: see FIG. 5A) of the air-fuel ratio sensors.

With this configuration, the air-fuel ratio imbalance detection employs the respective air-fuel ratio sensors disposed at the first exhaust passage (the first cylinder group) and the second exhaust passage (the second cylinder group). As described above, it is possible to accurately detect the air-fuel ratio of the exhaust gas at the upstream side of the catalyst for each cylinder, thus accurately detecting occurrence of the air-fuel ratio imbalance among the cylinders.

Advantageous Effects of Invention

The present invention accurately detects the air-fuel ratio of the exhaust gas at the upstream side of the catalyst for each cylinder, thus accurately detecting the air-fuel ratio imbalance among the cylinders.

BRIEF DESCRIPTION OF THE DRAWINGS

FIGS. 5A and 5B are graphs illustrating output waveforms of an air-fuel ratio sensor.

DESCRIPTION OF EMBODIMENTS

Hereinafter, a description will be given of an embodiment of the present invention by referring to the accompanying drawings.

First, a description will be given of an internal combustion engine (hereinafter also referred to as an engine) to which the present invention is applied.

Engine

Figure 1:
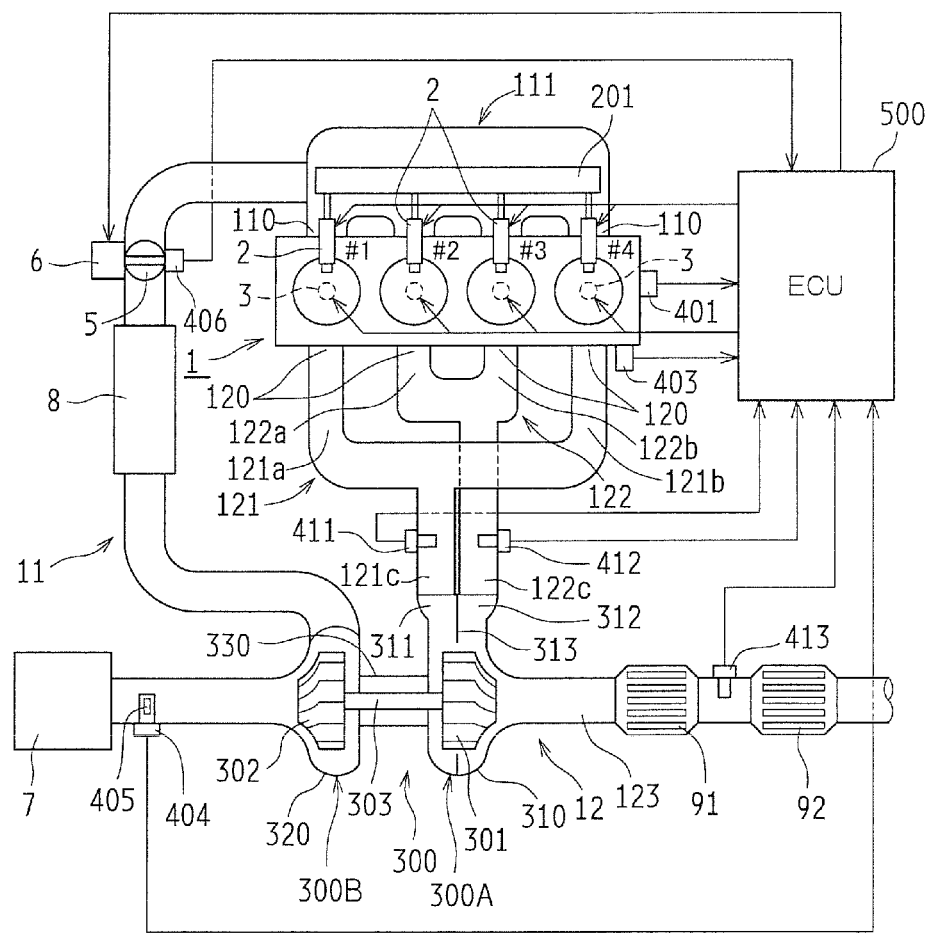
FIG. 1 is a schematic configuration diagram illustrating an exemplary multicylinder engine to which the present invention is applied.
Figure 2:
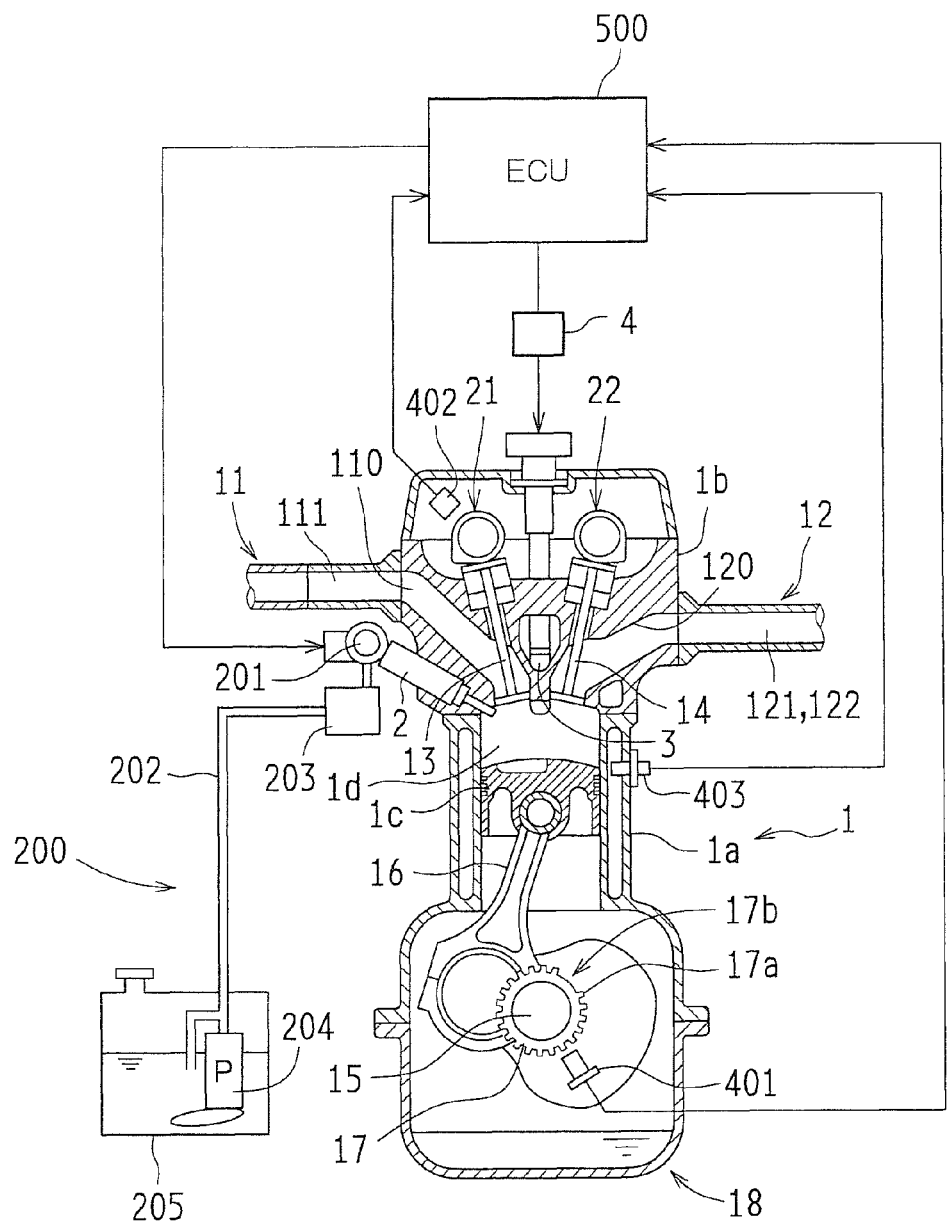
FIG. 2 is a schematic configuration diagram illustrating one cylinder of the engine in FIG. 1 alone.

FIG. 1 and FIG. 2 are diagrams illustrating schematic configurations of an engine to which the present invention is applied. Here, FIG. 2 illustrates a configuration of one cylinder of the engine alone. In FIG. 2, a turbocharger is omitted.

An engine 1 in this example is an in-cylinder injection type four-cylinder gasoline engine to be mounted on an automobile. The engine 1 includes cylinders #1, #2, #3, and #4 each constituted by a cylinder block 1a. In the cylinder block 1a, a piston 1c that reciprocates up and down. The piston 1c is coupled to a crankshaft 15 via a connecting rod 16. The connecting rod 16 converts reciprocation of the piston 1c into rotation of the crankshaft 15.

On the crankshaft 15, a signal rotor 17 is mounted. The signal rotor 17 has an outer peripheral surface where a plurality of teeth (protrusions) 17a are disposed equiangularly (for each 10°CA (crank angle) in this example). Additionally, the signal rotor 17 includes a tooth missing portion 17b where two teeth 17a are missing.

Adjacent to a side portion of the signal rotor 17, a crank position sensor 401 is disposed to detect a crank angle. The crank position sensor 401 is, for example, an electromagnetic pick-up that generates a pulse-shaped signal (a voltage pulse) corresponding to the teeth 17a of the signal rotor 17 when the crankshaft 15 rotates. Using an output signal of the crank position sensor 401, the number of rotations of the engine NE can be calculated.

In the cylinder block 1a of the engine 1, a water temperature sensor 403 is disposed to detect a water temperature of engine cooling water. At an upper end of the cylinder block 1a, a cylinder head 1b is disposed. Between this cylinder head 1b and the piston 1c, a combustion chamber 1d is formed. In the combustion chamber 1d of the engine 1, a spark plug 3 is disposed. Ignition timing of the spark plug 3 is adjusted by an ignitor 4. The ignitor 4 is controlled by an electronic control unit (ECU) 500.

In a lower portion of the cylinder block 1a of the engine 1, an oil pan 18 is disposed to store lubricating oil (engine oil). The lubricating oil stored in the oil pan 18 is pumped during operation of the engine 1 by an oil pump (not shown) through an oil strainer that removes foreign matters, and supplied to respective portions of the engine, for example, the piston 1c, the crankshaft 15, and the connecting rod 16 for lubrication. The lubricating oil is used for cooling, and similar purpose of the respective portions. Subsequently, the lubricating oil thus supplied is returned to the oil pan 18 after being used for lubrication, cooling, and similar purpose of the respective portions of the engine. The returned lubricating oil is stored in the oil pan 18 until the next pump of the oil pump.

The combustion chamber 1d of the engine 1 is coupled to an intake passage 11 and an exhaust passage 12. A part of the intake passage 11 is formed by an intake port 110 and an intake manifold 111. Here, while illustration is omitted, the intake passage 11 includes a surge tank.

The intake passage 11 includes an air cleaner 7, a hot-wire air flow meter 404, an intake air temperature sensor 405 (built in the air flow meter 404), a compressor impeller 302 of a turbocharger 300 described below, an intercooler 8, a throttle valve 5, and similar member. The air cleaner 7 filters the intake air (new air). The intercooler 8 is used for forcibly cooling the intake air heated by supercharging at the turbocharger 300. The throttle valve 5 is used for adjusting the intake air amount at the engine 1.

A throttle position of the throttle valve 5 is drivingly controlled by the ECU 500. Specifically, the throttle position of the throttle valve 5 is controlled to obtain an appropriate intake air amount (target intake amount) corresponding to an operating state of the engine 1, for example, the number of rotations of the engine NE calculated with an output signal of the crank position sensor 401 and a depression amount of an accelerator pedal (an accelerator position) by a driver. More specifically, a throttle position sensor 406 is used to detect an actual throttle position of the throttle valve 5. A throttle motor 6 of the throttle valve 5 is feedback-controlled such that the actual throttle position coincides with a throttle position (a target throttle position) where the target intake amount is obtained. Here, a control system of the throttle valve 5 is referred to as an "electronic throttle system", and also controls a throttle position independently from an operation of the accelerator pedal of the driver during idling.

Between the intake passage 11 and the combustion chamber 1d, an intake valve 13 is disposed. Driving this intake valve 13 open and closed allows communication and cut-off between the intake passage 11 and the combustion chamber 1d. Additionally, between the exhaust passage 12 and the combustion chamber 1d, an exhaust valve 14 is disposed. Driving this exhaust valve 14 open and closed allows communication and cut-off between the exhaust passage 12 and the combustion chamber 1d. The intake valve 13 and the exhaust valve 14 are driven open and closed by respective rotations of an intake camshaft 21 and an exhaust camshaft 22 to which rotation of the crankshaft 15 is transmitted via a timing chain and similar member.

Adjacent to the intake camshaft 21, a cam position sensor 402 is disposed. The cam position sensor 402 generates a pulse-shaped signal when the piston 1c of a specific cylinder (such as the first cylinder #1) reaches the compression top dead center (TDC). The cam position sensor 402 is, for example, an electromagnetic pick-up, and disposed to face one tooth (not shown) on an outer peripheral surface of a rotor integrated with the intake camshaft 21. The cam position sensor 402 outputs a pulse-shaped signal (a voltage pulse) when the intake camshaft 21 rotates. Here, the intake camshaft 21 (and the exhaust camshaft 22) rotates at a half rotation speed of the crankshaft 15. Accordingly, for every two rotations (a 720° rotation) of the crankshaft 15, the cam position sensor 402 generates one pulse-shaped signal.

Based on respective output signals of the cam position sensor 402 and the crank position sensor 401, during engine operation, piston positions (the intake stroke, the compression stroke, the explosion stroke, and the exhaust stroke) of the respective cylinders #1 to #4 can be detected. This allows engine operation controls such as a precise fuel injection control, an ignition timing control, and similar control. This point (cylinder determination process and similar process) will be described below.

Subsequently, respective cylinders #1 to #4 of the engine 1 each include an injector (a fuel injection valve) 2 that allows fuel direct injection in each combustion chamber 1d. These injectors 2 are coupled to a common delivery pipe 201. The delivery pipe 201 receives a supply of fuel (gasoline) stored in a fuel tank 205 of a fuel supply device 200 described below. This allows injecting fuel from the injector 2 into the combustion chamber 1d. This injected fuel is mixed with the intake air introduced into the combustion chamber 1d to make an air-fuel mixture. The air-fuel mixture (fuel+air) mixed inside of the combustion chamber 1d is ignited by the spark plug 3 for burning and explosion. A high-temperature and high-pressure combustion gas generated at this time causes reciprocation of the piston 1c. This rotates the crankshaft 15 to obtain a drive force (an output torque) of the engine 1. The combustion gas is discharged to the exhaust passage 12 along with opening of the exhaust valve 14. The engine 1 in this example provides burning and explosion at the first cylinder #1, the third cylinder #3, the fourth cylinder #4, and the second cylinder #2 in this order. An operating state of the engine 1 described above is controlled by the ECU 500.

The fuel supply device 200 includes, as illustrated in FIG. 2, the delivery pipe 201 coupled in common to the respective injectors 2 of the cylinders #1 to #4, a fuel supply pipe 202 coupled to the delivery pipe 201, a high-pressure fuel pump 203, a low-pressure fuel pump 204, the fuel tank 205, and similar member. The low-pressure fuel pump 204 and the high-pressure fuel pump 203 are driven to supply the fuel (gasoline) stored in the fuel tank 205 to the delivery pipe 201 through the fuel supply pipe 202. Subsequently, the fuel supply device 200 thus configured supplies the fuel to the respective injectors 2 of the cylinders #1 to #4.

Conversely, the exhaust passage 12 includes an exhaust port 120, a first exhaust manifold 121 (a first exhaust passage) and a second exhaust manifold 122 (a second exhaust passage) that are separate type, an exhaust pipe 123, and similar member. The first exhaust manifold 121 and the second exhaust manifold 122 are disposed to avoid exhaust interference between the cylinders.

The first exhaust manifold 121 includes two branch pipes 121a and 121b, and a branch collecting portion 121c. The branch pipes 121a and 121b have respective downstream end portions coupled to an upstream-side end portion of the branch collecting portion 121c. In this first exhaust manifold 121, one branch pipe 121a of the two branch pipes 121a and 121b is coupled to the exhaust port 120 of the first cylinder #1 while the other branch pipe 121b is coupled to the exhaust port 120 of the fourth cylinder #4. This collects an exhaust gas discharged from the first cylinder #1 and an exhaust gas discharged from fourth cylinder #4 in the first exhaust manifold 121. The collected exhaust gases flow from the branch collecting portion 121c into a first exhaust gas inflow port 311 of the turbocharger 300 described below.

The second exhaust manifold 122 includes two branch pipes 122a and 122b, and a branch collecting portion 122c. The branch pipes 122a and 122b have respective downstream end portions coupled to an upstream-side end portion of the branch collecting portion 122c. In this second exhaust manifold 122, one branch pipe 122a of the two branch pipes 122a and 122b is coupled to the exhaust port 120 of the second cylinder #2 while the other branch pipe 122b is coupled to the exhaust port 120 of the third cylinder #3. This collects an exhaust gas discharged from the second cylinder #2 and an exhaust gas discharged from the third cylinder #3 into the second exhaust manifold 122. The collected exhaust gases flow from the branch collecting portion 122c into a second exhaust gas inflow port 312 of the turbocharger 300 described below.

Figure 3:
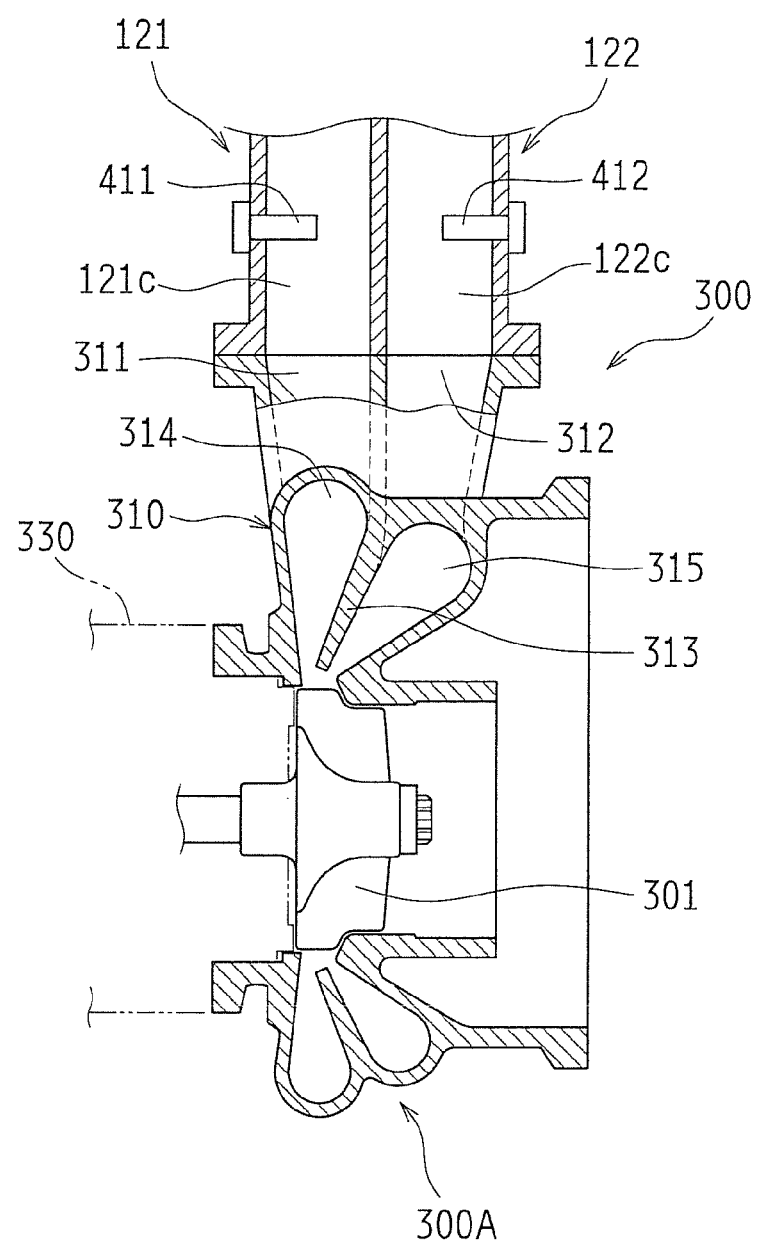
FIG. 3 is a cross-sectional view illustrating a part of a configuration of a turbocharger equipped at the engine in FIG. 1.

This example has the following feature, as illustrated in FIG. 1 and FIG. 3. The branch collecting portion 121c (a collecting portion into which the collected exhaust gases from the respective cylinders #1 and #4 in a first cylinder group flow) of the first exhaust manifold 121 includes a first air-fuel ratio sensor (an A/F sensor) 411. The branch collecting portion 122c (a collecting portion into which the collected exhaust gases from the respective cylinders #2 and #3 in a second cylinder group flow) of the second exhaust manifold 122 includes a second air-fuel ratio sensor (an A/F sensor) 412.

The first air-fuel ratio sensor 411 and the second air-fuel ratio sensor 412 employ, for example, limiting current-type oxygen sensors, and each have a configuration that outputs a voltage corresponding to an air-fuel ratio in a wide air-fuel ratio range. In this example, the first air-fuel ratio sensor 411 and the second air-fuel ratio sensor 412 each employ a sensor with the same characteristics including responsivity. Respective output signals of the first air-fuel ratio sensor 411 and the second air-fuel ratio sensor 412 are input to the ECU 500.

In the following description, "the first air-fuel ratio sensor 411 and the second air-fuel ratio sensor 412" are referred to also as "air-fuel ratio sensors 411 and 412".

Additionally, in the exhaust passage 12 (the exhaust pipe 123), as illustrated in FIG. 1, an S/C catalyst (a start catalyst) 91 in a former portion and a U/F catalyst (an underfloor catalyst) 92 in a latter position are disposed.

The S/C catalyst 91 and the U/F catalyst 92 are both three-way catalysts. The three-way catalyst has an $O_2$ storage function (oxygen storage function) that stores (absorbs) oxygen. This oxygen storage function purifies HC, CO and NOx even if an air-fuel ratio deviates from an ideal air-fuel ratio by a certain amount. That is, in the case where the air-fuel ratio of the engine 1 becomes lean such that oxygen and NOx increase in the exhaust gas flowing into the three-way catalysts of the S/C catalyst 91 and the U/F catalyst 92, the S/C catalyst 91 and the U/F catalyst 92 absorb a part of the oxygen to accelerate reduction and purification of NOx. Conversely, in the case where the air-fuel ratio of the engine 1 becomes rich such that the exhaust gas flowing into the S/C catalyst 91 and the U/F catalyst 92 contains a large amount of HC and CO, the S/C catalyst 91 and the U/F catalyst 92 discharge oxygen molecules absorbed inside and provide oxygen molecules to the HC and the CO to accelerate oxidation and purification.

The S/C catalyst 91 is disposed at an upstream side (a side close to the combustion chamber 1d) of the exhaust passage 12. Accordingly, the S/C catalyst 91 is heated up to an activation temperature in a short time after the engine 1 is started, as a feature. Additionally, the U/F catalyst 92 is used for purifying HC, CO, and NOx that are not purified by the S/C catalyst 91, and disposed at a lower side of a floor panel constituting a vehicle body.

Additionally, in the exhaust passage 12 (the exhaust pipe 123), an oxygen sensor (an $O_2$ sensor) 413 is disposed at a downstream side of the S/C catalyst 91 and is at an upstream side of the U/F catalyst 92. The oxygen sensor 413 is a sensor that shows a characteristic (a Z characteristic) where an output value changes in a stepped shape near an ideal air-fuel ratio (a stoichiometric ratio). In this example, an electromotive force type (concentration cell type) oxygen concentration sensor or similar sensor is employed.

Turbocharger

In the engine 1 in this example, the turbocharger (the supercharger) 300 that supercharges intake air using exhaust gas pressure is equipped.

The turbocharger 300 includes a turbine wheel 301, the compressor impeller 302, a coupling shaft 303, and similar member. The turbine wheel 301 is disposed at the exhaust passage 12 as illustrated in FIG. 1 and FIG. 3. The compressor impeller 302 is disposed at the intake passage 11. The coupling shaft 303 is rotatably integrated with the turbine wheel 301 and the compressor impeller 302. The turbine wheel 301 disposed at the exhaust passage 12 rotates by energy of the exhaust air. In association with this rotation, the compressor impeller 302 at the intake passage 11 rotates. The rotation of the compressor impeller 302 supercharges intake air to forcibly send the supercharged air into the respective combustion chambers 1d of the cylinders #1 to #4 of the engine 1.

The turbine wheel 301 is housed in a turbine housing 310. The compressor impeller 302 is housed in a compressor housing 320. The turbine housing 310 and the compressor housing 320 are mounted at the respective sides of a center housing 330. The compressor impeller 302, the compressor housing 320, and similar member constitute a compressor 300B. The turbine wheel 301, the turbine housing 310, and similar member constitute a turbine 300A.

The turbocharger 300 in this example is a twin-entry (twin-scroll) turbocharger. The turbine 300A (the turbine housing 310) includes a scroll chamber partitioned into two portions (partitioned into a first scroll chamber 314 and a second scroll chamber 315) by a partition wall 313, and includes two exhaust gas inflow ports (the first exhaust gas inflow port 311 and the second exhaust gas inflow port 312).

The first exhaust gas inflow port 311 is coupled to the branch collecting portion 121c of the first exhaust manifold 121. The exhaust gas discharged from the first cylinder #1 and the exhaust gas discharged from the fourth cylinder #4 join together in the first exhaust manifold 121, and flow into the turbine housing 310 (into the first scroll chamber 314 partitioned by the partition wall 313) passing through the first exhaust gas inflow port 311. This rotates the turbine wheel 301. The second exhaust gas inflow port 312 is coupled to the branch collecting portion 122c of the second exhaust manifold 122. The exhaust gas discharged from the second cylinder #2 and the exhaust gas discharged from the third cylinder #3 are collected in the second exhaust manifold 122, and flow into the turbine housing 310 (into the second scroll chamber 315 partitioned by the partition wall 313) passing through the second exhaust gas inflow port 312. This rotates the turbine wheel 301. This twin-entry turbocharger 300 reduces interference of exhaust gas pulsation among cylinders. Thus an excellent supercharging characteristic is obtained.

The turbocharger 300 of this example may be configured as follows. An exhaust bypass passage is disposed in communication between an upstream side and a downstream side of the turbine wheel 301 (bypassing the turbine wheel 301). A waste gate valve (WGV) is disposed to open and close this exhaust bypass passage. Supercharging pressure is controlled by adjusting the opening degree of the waste gate valve and by adjusting an amount of the exhaust gas bypassing the turbine wheel 301.

The engine 1 of this example may include an EGR unit (not shown). The EGR unit is a unit that introduces a part of exhaust gas into intake air to reduce a combustion temperature in the combustion chamber 1d so as to reduce NOx emission. The EGR unit includes, for example, an EGR passage, a catalyst disposed at the EGR passage, an EGR cooler, an EGR valve, and similar member. The EGR passage communicates between: the exhaust passage 12 (the first exhaust manifold 121 and the second exhaust manifold 122) at an upstream side (an upper stream of the exhaust gas flow) of the turbine wheel 301 in the turbocharger 300, and the intake passage 11 (the intake manifold 111) at a downstream side (a downstream side of intake air flow) of the intercooler 8 (the compressor impeller 302 in the turbocharger 300). In the EGR unit thus configured, adjusting degree of opening of the EGR valve allows change in EGR rate [an EGR amount/(an EGR amount+an intake air amount (a new air amount))(%)], thus adjusting an EGR amount (an exhaust recirculation amount) introduced from the exhaust passage 12 into the intake passage 11.

—ECU—

Figure 4:
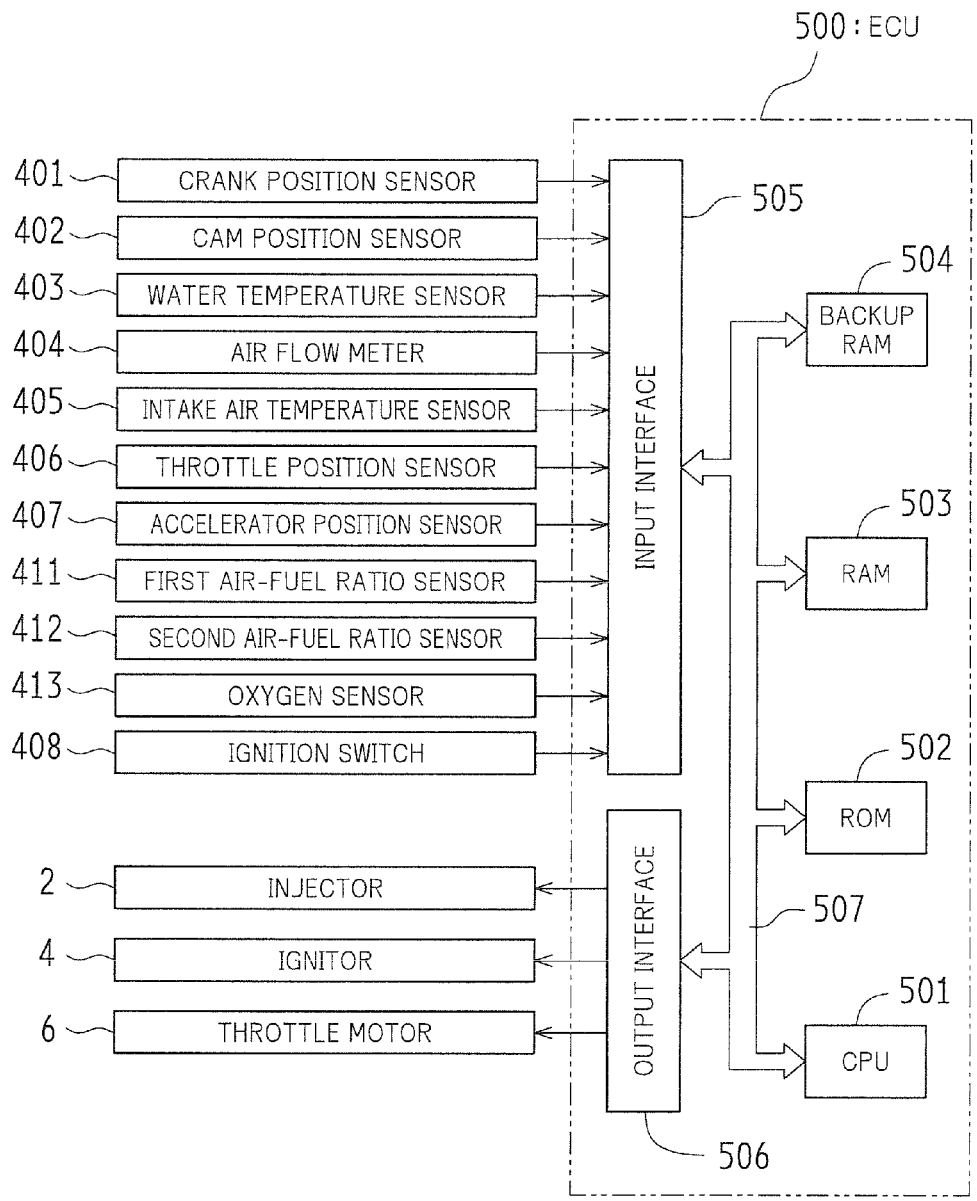
FIG. 4 is a block diagram illustrating a configuration of a control system such as an ECU.

The ECU 500 includes, as illustrated in FIG. 4, a central processing unit (CPU) 501, a read only memory (ROM) 502, a random access memory (RAM) 503, a backup RAM 504, and similar member.

The ROM 502 stores various control programs, a map referenced when the various control programs are executed, and similar data. The CPU 501 executes various arithmetic processes based on the various control programs and the map that are stored in the ROM 502. The RAM 503 is a memory that temporarily stores, for example, results of arithmetic operations in the CPU 501 and data input from respective sensors. The backup RAM 504 is, for example, a non-volatile memory that stores data to be saved when the engine 1 is stopped.

The CPU 501, the ROM 502, the RAM 503, and the backup RAM 504 are coupled together via a bus 507, and coupled to an input interface 505 and an output interface 506.

The input interface 505 is coupled to various sensors such as the crank position sensor 401, the cam position sensor 402, the water temperature sensor 403, the air flow meter 404, the intake air temperature sensor 405, the throttle position sensor 406, an accelerator position sensor 407, the first air-fuel ratio sensor 411, the second air-fuel ratio sensor 412, and the oxygen sensor 413. The accelerator position sensor 407 outputs a detection signal corresponding to a depression amount of the accelerator pedal. Additionally, the input interface 505 is coupled to an ignition switch 408. When the ignition switch 408 is turned on, a starter motor (not shown) starts cranking the engine 1.

The output interface 506 is coupled to the injector 2, the ignitor 4 of the spark plug 3, the throttle motor 6 of the throttle valve 5, and similar member.

The ECU 500 performs various controls of the engine 1 based on detection signals of the above-described various sensors. The various controls include a drive control (a fuel injection amount adjusting control) of the injector 2, an ignition timing control of the spark plug 3, a drive control (an intake air amount control) of the throttle motor 6 of the throttle valve 5, and similar control. Additionally, the ECU 500 performs "a cylinder determination process", "an air-fuel ratio feedback control", and, "an air-fuel ratio imbalance detection process among the cylinders" below.

Cylinder Determination Process

The cylinder determination process performed by the ECU 500 will be described.

First, in the signal rotor 17 used for detecting a crank angle applied to this example, as illustrated in FIG. 2, respective teeth 17a are formed at an interval of for example, 10°CA. The signal rotor 17 includes 34 teeth 17a where two teeth are missing. When this tooth missing portion 17b of the signal rotor 17 passes at a proximity of the crank position sensor (such as an electromagnetic pick-up) 401, long-interval voltage pulses are generated. An output of a signal (a tooth missing signal) corresponding to the tooth missing portion 17b of the signal rotor 17 allows detection of a rotation phase (a crank position) of the crankshaft 15, thus detecting the timing when each cylinder is positioned at top dead center. The output signal (the tooth missing signal) of the crank position sensor 401 corresponding to the tooth missing portion 17b of the signal rotor 17 is a signal for determining a position of top dead center for each cylinder, that is, "a TDC position determining signal".

Here, in a four-cycle engine (a four-cylinder engine), two rotations (720°CA) of a crankshaft that rotates corresponding to up-and-down movement of a piston is one cycle of an engine cycle. Each cylinder is positioned at top dead center twice a cycle of the engine cycle. Accordingly, with the output signal (the tooth missing signal) of the crank position sensor 401 alone, it cannot be determined that the cylinder is positioned at which top dead center among two top dead centers. That is, cylinder determination cannot be performed. Therefore, in this example, the output signal (the tooth missing signal) of the crank position sensor 401 is combined with the output signal (the voltage pulse) of the cam position sensor 402 to allow the cylinder determination. This cylinder determination will be described below.

First, the crank position sensor 401 as described above outputs one tooth missing signal (twice a cycle in the engine cycle) during one rotation (360°CA) of the crankshaft 15. In this example, the crank position sensor 401 outputs the tooth missing signal at a predetermined crank angle before top dead center of the first cylinder #1 and the fourth cylinder #4.

The cam position sensor 402 as described above outputs one voltage pulse (once a cycle in the engine cycle) during two rotations of the crankshaft 15. In this example, the cam position sensor 402 outputs the voltage pulse when the first cylinder #1 is positioned at the compression top dead center and the fourth cylinder #4 is positioned at the exhaust top dead center.

In this configuration, in the case where the cam position sensor 402 generates the voltage pulse when the crank position sensor 401 outputs the tooth missing signal, the first cylinder #1 is positioned at the compression top dead center and the fourth cylinder #4 is positioned at the exhaust top dead center. In the case where the cam position sensor 402 does not generate the voltage pulse when the crank position sensor 401 outputs the tooth missing signal, the first cylinder #1 is positioned at the exhaust top dead center and the fourth cylinder #4 is positioned at the compression top dead center. Thus, the voltage pulse generated by the cam position sensor 402 is a signal for performing the cylinder determination, that is, "a cylinder determining signal".

Accordingly, based on: the tooth missing signal (a first detection of the TDC position determining signal) of the crank position sensor 401, and existence of generation of the cylinder determining signal (the voltage pulse) by the cam position sensor 402 corresponding to this detection, the cylinder determination (crank angle determination) can be performed at the latest within one rotation of the crankshaft 15. This cylinder determination allows detecting respective piston positions (the intake stroke, the compression stroke, the explosion stroke, and the exhaust stroke) of the cylinders #1 to #4, for example, during engine starting and during operation after starting. This allows precise engine operation controls such as the fuel injection control and the ignition timing control.

While in the above-described process the respective output signals of the crank position sensor 401 and the cam position sensor 402 are used for performing the cylinder determination (the crank angle determination), detection of the respective piston positions of the cylinders #1 to #4, and similar control, another known means may be used for performing the cylinder determination (the crank angle determination), detection of the respective piston positions of the cylinders #1 to #4, and similar control.

Air-Fuel Ratio Feedback Control

The ECU 500 calculates an oxygen concentration in the exhaust gas based on respective outputs of the air-fuel ratio sensors 411 and 412 and the oxygen sensor 413 at the exhaust passage 12 of the engine 1. The ECU 500 performs the air-fuel ratio feedback control (a stoichiometric control) such that an actual air-fuel ratio obtained from the calculated oxygen concentration coincides with a target air-fuel ratio (such as an ideal air-fuel ratio), so as to control a fuel injection amount injected from the injector 2 into the combustion chamber 1d. A specific process of this air-fuel ratio feedback control will be described.

First, the S/C catalyst 91, which is a three-way catalyst, provides a function that oxidizes unburned components (HC and CO) and reduces nitrogen oxides (NOx) at the same time when the air-fuel ratio is approximately the ideal air-fuel ratio (the stoichiometric ratio, for example, A/F=14.6±0.2 approximately). Additionally, the S/C catalyst (the three-way catalyst) 91 has, as described above, the function (an oxygen absorbing function or an $O_2$ storage function) for absorbing oxygen. This oxygen absorbing function purifies HC, CO, and NOx even if the air-fuel ratio deviates from the ideal air-fuel ratio to a certain amount. That is, if the air-fuel ratio of the engine 1 becomes lean such that the exhaust gas flowing into the S/C catalyst 91 contains a large amount of NOx, the S/C catalyst 91 removes oxygen molecules from NOx to absorb these oxygen molecules and reduce NOx. This purifies NOx. If the air-fuel ratio of the engine 1 becomes rich such that the exhaust gas flowing into the S/C catalyst 91 contains a large amount of HC and CO, the S/C catalyst 91 provides absorbed oxygen molecules to HC and CO for oxidation. This purifies HC and CO.

Therefore, in order to efficiently purify a large amount of HC and CO that continuously flow in through the S/C catalyst (the three-way catalyst) 91, this S/C catalyst 91 needs to store a large amount of oxygen. Conversely, in order to efficiently purify a large amount of NOx that continuously flows in, the S/C catalyst 91 needs to sufficiently absorb oxygen. As is clear above, purification performance of the S/C catalyst 91 depends on the maximum amount of oxygen (the maximum amount of oxygen absorption) that is a possible amount of absorption by the S/C catalyst 91.

Conversely, the S/C catalyst (the three-way catalyst) 91 degrades due to poisoning by lead, sulfur, and similar components contained in the fuel, or due to heat applied to the catalyst. Along with this degradation, the maximum amount of oxygen absorption is gradually decreased. Accordingly, even in the case where the maximum amount of oxygen absorption is decreased, properly maintaining the emission needs a control such that the air-fuel ratio of the gas discharged from the S/C catalyst 91 becomes extremely close to the ideal air-fuel ratio.

Therefore, in this example, the air-fuel ratio feedback control is performed. Specifically, a combination of a main feedback control and a sub-feedback control is performed. The main feedback control changes the air-fuel ratio of the exhaust gas at an upstream side (an upstream side of the exhaust gas flow) of the S/C catalyst (the three-way catalyst) 91 close to the ideal air-fuel ratio based on respective outputs of the air-fuel ratio sensors 411 and 412. Based on an output of the oxygen sensor 413, the sub-feedback control compensates for the difference by the main feedback control.

In the main feedback control, an increase and decrease of the fuel injection amount from the injector 2 is adjusted such that the air-fuel ratio of the exhaust gas detected based on the outputs of the air-fuel ratio sensors 411 and 412 coincides with the ideal air-fuel ratio. More specifically, in the case where the air-fuel ratio of the detected exhaust gas is richer than the ideal air-fuel ratio, the fuel injection amount is adjusted by reducing the amount. In contrast, in the case where the air-fuel ratio of the exhaust gas is leaner than the ideal air-fuel ratio, the fuel injection amount is adjusted by increasing the amount.

Ideally, the main feedback control maintains the air-fuel ratio of the exhaust gas flowing into the S/C catalyst 91 at the ideal air-fuel ratio. If this state is strictly maintained, an amount of oxygen absorbed by the S/C catalyst 91 is maintained in approximately a constant amount. This completely prevents outflow of exhaust gas containing an unpurified component to a downstream side of the S/C catalyst 91.

Here, in this example, the two air-fuel ratio sensors 411 and 412 are provided. Accordingly, when the main feedback control is performed, respective maps are used in a main feedback control of the air-fuel ratio of the first cylinder #1 and the fourth cylinder #4 and in a main feedback control of the air-fuel ratio of the second cylinder #2 and the third cylinder #3. Based on the output of the first air-fuel ratio sensor 411, the main feedback control is performed by referring to a map for the first and the fourth cylinders. Based on the output of the second air-fuel ratio sensor 412, the main feedback control is performed by referring to a map for the second and the third cylinders. In this main feedback control, the ECU 500 can detect the exhaust stroke of the cylinders #1 to #4 by the cylinder determination process. Accordingly, the ECU 500 can detect a relationship between: the air-fuel ratio of the exhaust gas discharged from the respective cylinders of the first cylinder #1 and the fourth cylinder #4; and the output of the first air-fuel ratio sensor 411, and detect a relationship between: the air-fuel ratio of the exhaust gas discharged from the respective cylinders of the second cylinder #2 and the third cylinder #3; and the output of the second air-fuel ratio sensor 412.

Incidentally, the outputs of the air-fuel ratio sensors 411 and 412 include a certain amount of error. Additionally, an injection characteristic of the injector 2 varies to some extent. Thus, realistically, it is difficult to strictly control the air-fuel ratio of the exhaust gas at the upstream side of the S/C catalyst 91 to have the ideal air-fuel ratio by performing the main feedback control only.

For this reason, even in the case where the main feedback control is performed, the exhaust gas containing the unpurified component may flow out at the downstream side of the S/C catalyst 91. That is, even in the case where the main feedback control is performed, the air-fuel ratio of the exhaust gas at the upstream side of the S/C catalyst 91 is biased to a rich side or a lean side as a whole. As a result, a rich exhaust gas containing HC and CO or a lean exhaust gas containing NOx may flow out at the downstream side of the S/C catalyst 91.

When these exhaust gases flow out, the oxygen sensor 413 generates a rich output or a lean output corresponding to the air-fuel ratio of the exhaust gas. In the case where the oxygen sensor 413 generates the rich output, it is determined that the air-fuel ratio of the exhaust gas at the upstream side of the S/C catalyst 91 is biased to the rich side as a whole. In the case where the oxygen sensor 413 generates the lean output, it is determined that the air-fuel ratio of the exhaust gas at the upstream side of the S/C catalyst 91 is biased to the lean side as a whole.

In the sub-feedback control, in the case where the output of the oxygen sensor 413 becomes a value representing a leaner air-fuel ratio than the ideal air-fuel ratio, a sub-feedback correction amount is obtained by a proportional-integral-derivative process (a PID process) on a deviation between the output of the oxygen sensor 413 and the target value approximately equivalent to the ideal air-fuel ratio. Subsequently, the respective outputs of the air-fuel ratio sensors 411 and 412 by this sub-feedback correction amount are corrected. Accordingly, an actual air-fuel ratio of the engine 1 is set to be apparently at the lean side compared with the detected air-fuel ratio of the air-fuel ratio sensors 411 and 412. A feedback control is performed such that the apparent corrected air-fuel ratio becomes the target air-fuel ratio (the target air-fuel ratio of the engine 1, here, the ideal air-fuel ratio).

Similarly, in the case where the output of the oxygen sensor 413 becomes a value representing a richer air-fuel ratio than the ideal air-fuel ratio, a sub-feedback correction amount is obtained by a proportional-integral-derivative process (a PID process) on a deviation between the output of the oxygen sensor 413 and the target value approximately equivalent to the ideal air-fuel ratio. Subsequently, the respective outputs of the air-fuel ratio sensors 411 and 412 by this sub-feedback correction amount are corrected. Accordingly, an actual air-fuel ratio of the engine 1 is set to be apparently at the rich side compared with the detected air-fuel ratio of the air-fuel ratio sensors 411 and 412. A feedback control is performed such that the apparent corrected air-fuel ratio becomes the target air-fuel ratio (the target air-fuel ratio of the engine 1, here, the ideal air-fuel ratio).

Therefore, the air-fuel ratio of the exhaust gas at the downstream side of the S/C catalyst (the three-way catalyst) 91 coincides with the target air-fuel ratio (approximately the ideal air-fuel ratio) in the same portion.

Air-Fuel Ratio Imbalance Detection Process Among the Cylinders

Next, a description will be given of the air-fuel ratio imbalance detection process among the cylinders.

First, for example, in the case where a fuel supply system such as the injector 2 and an air system such as the air flow meter 404 become abnormal such that all the cylinders #1 to #4 of the engine 1 are affected, an absolute value of the correction amount of the air-fuel ratio in the main feedback control becomes larger. Accordingly, monitoring this absolute value by the ECU 500 detects the abnormality.

For example, during the air-fuel ratio feedback control (during the stoichiometric control), in the case where the fuel injection amount deviates with respect to a stoichiometric equivalent amount by 5% as a whole (that is, in the case where respective fuel injection amounts deviate with respect to a stoichiometric equivalent amount by 5% in all the cylinders #1 to #4), an amount of feedback correction in the main feedback control becomes a value correcting a deviated amount by 5%, that is, a correction amount equivalent to −5%. This allows detecting a 5% deviation of the fuel supply system or the air system. In the case where this feedback correction amount is equal to or more than a predetermined determination threshold value, this allows detecting an abnormality of the fuel supply system or the air system.

Conversely, in a state where the fuel supply system or the air system does not deviate as a whole, variation (imbalance) in air-fuel ratio among the cylinders may occur. In the case where the air-fuel ratio imbalance among the cylinders occur, respective output waveforms of the first air-fuel ratio sensor 411 and the second air-fuel ratio sensor 412 becomes waveforms as illustrated in FIGS. 5A and 5B.

As illustrated in FIGS. 5A and 5B, the respective output waveforms of the air-fuel ratio sensors 411 and 412 (A/F waveforms) tend to oscillate around the stoichiometric ratio as the center. However, when the air-fuel ratio imbalance among the cylinders occurs, the oscillation has a larger amplitude corresponding to degree of the imbalance.

Here, the example illustrated in FIGS. 5A and 5B shows a case where only the first cylinder #1 deviates to the rich side among the four cylinders #1 to #4 of the engine 1. An A/F sensor output waveform (FIG. 5A) of the first air-fuel ratio sensor 411 (the air-fuel ratio sensor for the first cylinder #1 and the fourth cylinder #4 in the cylinder group) has a larger oscillation amplitude compared with an A/F sensor output waveform (FIG. 5B: a waveform without the imbalance among the cylinders) of the second air-fuel ratio sensor 412 (the air-fuel ratio sensor for the second cylinder #2 and the third cylinder #3 in the cylinder group). An A/F sensor output waveform a1 illustrated in FIG. 5A shows a case where an exhaust gas air fuel ratio of the first cylinder #1 deviates to the rich side by an imbalance rate (a rate of the fuel injection amount to the stoichiometric equivalent amount (the fuel amount)) of +20%. An A/F sensor output waveform a2 shows a case where an exhaust gas air fuel ratio of the first cylinder #1 deviates to the rich side by an imbalance rate of +50%. In FIGS. 5A and 5B, the A/F sensor output waveform deviates to the rich side because the respective outputs of the air-fuel ratio sensors 411 and 412 tend to be larger at the rich side than the lean side due to an influence of hydrogen.

As described above, a larger air-fuel ratio imbalance among the cylinders provides larger amplitudes of the oscillations in the output waveforms of the air-fuel ratio sensors 411 and 412. Accordingly, monitoring these amplitudes by the ECU 500 detects imbalance abnormality among the cylinders. An exemplary method for detecting the imbalance abnormality will be described below.

Here, the air-fuel ratio imbalance detection process among the cylinders performed by the ECU 500 corresponds to "an imbalance detecting unit configured to detect whether or not an air-fuel ratio imbalance among the cylinders occurs".

(1) The ECU 500 monitors the respective A/F sensor output waveforms (see FIGS. 5A and 5B described above) based on the output signals of the air-fuel ratio sensors 411 and 412. Peak values (such as a peak value at the rich side: see FIG. 5A) of the A/F sensor output waveforms are obtained sequentially.

Subsequently, the respective peak values of the A/F sensor output waveforms are compared with a predetermined determination threshold value. In the case where the peak values of the A/F sensor output waveforms are equal to or more than the predetermined determination threshold value, it is recognized (detected) that the imbalance abnormality among the cylinders occurs.

Regarding the determination threshold value set for the peak value of the A/F sensor output waveform, considering a range (an allowable variation degree among cylinders) where the air-fuel ratio imbalance among the cylinders can be absorbed by the air-fuel ratio feedback control, the purification performance of the three-way catalyst (the S/C catalyst 91 and the U/F catalyst 92), and similar parameter, a value (a difference allowable value with respect to the stoichiometric ratio) that does not degrade the exhaust emission is obtained by experiment, calculation, or similar method. Based on this result, a compatible value (the determination threshold value) is simply set.

(2) As described above, utilizing the fact that the larger air-fuel ratio imbalance among the cylinders provides larger amplitudes of the oscillations in the output waveforms of the air-fuel ratio sensors 411 and 412, that is, the fact that the larger imbalance rate provides a larger slope of the A/F sensor output waveform (see FIG. 5A), the imbalance abnormality of the air-fuel ratio among the cylinders is detected based on the slope of the A/F sensor output waveform.

Specifically, the ECU 500 monitors the respective A/F sensor output waveforms (see FIGS. 5A and 5B described above) based on the output signals of the air-fuel ratio sensors 411 and 412. Slopes (such as a slope of change from the lean side to the rich side: see FIG. 5A) of the A/F sensor output waveforms are obtained sequentially. Subsequently, the respective slopes of the A/F sensor output waveforms are compared with a predetermined determination threshold value (slope). In the case where the slopes of the sensor output waveforms are equal to or more than the predetermined determination threshold value, occurrence of the imbalance abnormality among the cylinders is recognized (detected).

Regarding the determination threshold value set for the peak value of the A/F sensor output waveform, considering a range (an allowable variation degree among cylinders) where the air-fuel ratio imbalance among the cylinders can be absorbed by the air-fuel ratio feedback control, the purification performance of the three-way catalyst (the S/C catalyst 91 and the U/F catalyst 92), and similar parameter, a value (a slope) that does not degrade the exhaust emission is obtained by experiment, calculation, or similar method. Based on this result, a compatible value (the determination threshold value) is simply set.

As described above, in this embodiment, based on the outputs of the air-fuel ratio sensors 411 and 412, the air-fuel ratio imbalance among the cylinders can be detected in a vehicle (the inter-cylinder air-fuel ratio imbalance detection OBD).

Here, in this embodiment, as described above, a part of the exhaust passage 12 (the upstream side of the turbocharger 300) is constituted by the first exhaust manifold 121 and the second exhaust manifold 122 which are separated type. Additionally, the branch collecting portion 121c of the first exhaust manifold 121 is coupled to the first exhaust gas inflow port 311 of the turbocharger 300. The branch collecting portion 122c of the second exhaust manifold 122 is coupled to the second exhaust gas inflow port 312 of the turbocharger 300. The first air-fuel ratio sensor 411 is disposed at the branch collecting portion 121c of the first exhaust manifold 121. The second air-fuel ratio sensor 412 is disposed at the branch collecting portion 122c of the second exhaust manifold 122.

Thus, at the upstream side of the turbocharger 300, the first air-fuel ratio sensor 411 is disposed at the position (the branch collecting portion 121c) after the respective exhaust gases from the first cylinder #1 and the fourth cylinder #4 are collected. The second air-fuel ratio sensor 412 is disposed at the position (the branch collecting portion 122c) after the respective exhaust gases from the second cylinder #2 and the third cylinder #3 are collected. This allows the exhaust gas to properly collide with element portions of the respective air-fuel ratio sensors 411 and 412.

That is, even if the air-fuel ratio sensor is disposed at the upstream side of the turbocharger 300, in the case where exhaust gases from the four cylinders #1 to #4 is detected by one air-fuel ratio sensor, this inevitably provides a cylinder that provides a poor collision of the gas into the element portion of the air-fuel ratio sensor and another cylinder that provides a good collision of the gas. This reduces detection accuracy of the air-fuel ratio of the exhaust gas. Additionally, one exhaust sensor needs to detect the air-fuel ratios of the four cylinders #1 to #4. Thus, high responsivity of the air-fuel ratio sensor is required.

In contrast, as described above, in the case where the respective air-fuel ratio sensors 411 and 412 are disposed for two cylinders (the first cylinder #1 and the fourth cylinder #4, and the second cylinder #2 and the third cylinder #3), the locations of the air-fuel ratio sensors 411 and 412 are simply determined considering respective flows (respective exhaust gas flows inside of the branch collecting portions 121c and 122c) of the exhaust gases from the two cylinders only. This provides high degree of freedom in location of the air-fuel ratio sensors. Thus, the respective element portions of the air-fuel ratio sensors 411 and 412 can be disposed at positions (positions where the respective exhaust gases from the cylinders flow smoothly) that provide good collisions of the gases. Additionally, the first air-fuel ratio sensor 411 simply detects the air-fuel ratio of the first cylinder #1 and the air-fuel ratio of the fourth cylinder #4 where the respective exhaust strokes are not adjacent to each other. Also, the second air-fuel ratio sensor 412 simply detects the air-fuel ratio of the second cylinder #2 and the air-fuel ratio of the third cylinder #3 where the respective exhaust strokes are not adjacent to each other. Accordingly, compared with a case where one air-fuel ratio sensor is disposed for the four cylinders #1 to #4, a time interval for detecting the exhaust gas air fuel ratio becomes longer (double). This allows certain separation of the respective outputs of the air-fuel ratio sensors 411 and 412 for each cylinder. This allows accurately detecting the air-fuel ratio at the upstream side of the S/C catalyst 91 for each cylinder, thus accurately detecting the air-fuel ratio imbalance among the cylinders. When imbalance abnormality occurs, this abnormality can be certainly detected. As a result, the above-described detection of the air-fuel ratio imbalance among the cylinders is permitted under OBD laws.

The above-described Patent Literature 3 (all description in Japanese Unexamined Utility Model Application Publication No. S62-162349) discloses a structure of a supercharger-equipped engine where an exhaust gas introducing passage to an exhaust turbine of an exhaust turbocharger is formed by first and second exhaust passages. A wall portion is disposed in a collecting portion of the first and second exhaust passages. The wall portion includes an exhaust sensor exposed to an exhaust flow through the first and second exhaust passages.

However, in the structure described in Patent Literature 3, the first exhaust passage and the second exhaust passage join together at a downstream side of the wall portion. Accordingly, an exhaust gas flowing through the first exhaust passage turns around and flows into the second exhaust passage (an exhaust gas flowing through the second exhaust passage turns around and flows into the first exhaust passage). Thus, it is difficult to accurately detect an air-fuel ratio for each cylinder. Additionally, one exhaust sensor is disposed for four cylinders. Thus, the degree of freedom in location of the exhaust sensor is low, and it is difficult to efficiently contact an element portion of the exhaust sensor with the exhaust gases flowing through the first and second exhaust passages. Additionally, one exhaust sensor needs to detect the air-fuel ratios of the four cylinders. The exhaust sensor is required to have high responsivity for surely separating exhaust sensor outputs for each cylinder.

Imbalance Detection Process at the Lean Side

Next, a description will be given of an imbalance detection process (an imbalance detection process at the lean side) in the case where the fuel injection amount of a part of cylinders among the four cylinders #1 to #4 of the engine 1 deviates to the lean side compared with the stoichiometric equivalent amount.

First, in the case where a fuel injection system of a cylinder (such as the first cylinder #1) among the four cylinders #1 to #4 has a trouble (such as clogging of the injector 2) and the fuel injection amount of the cylinder deviates to the lean side with respect to the stoichiometric equivalent amount (imbalance to the lean side occurs), an engine rotation speed decreases in the explosion stroke of the cylinder (including a case of a plurality of cylinders). In the explosion stroke of the cylinder (the first cylinder #1) where this air-fuel ratio imbalance has occurred, a time required for rotating the crankshaft 15 by a certain crank angle becomes longer than those in the explosion strokes of other cylinders (such as the second cylinder #2 to the fourth cylinder #4). Accordingly, measuring these times for comparison allows recognizing (detecting) the air-fuel ratio imbalance among the cylinders.

An example of a specific process will be described. First, the ECU 500 acquires respective output signals of the crank position sensor 401 and the cam position sensor 402 for each predetermined crank angle (for example, every 30°CA). Based on the respective signals, when the first cylinder #1 is in the explosion stroke, the ECU 500 calculates a difference between an elapsed time T1 and an elapsed time T2. The elapsed time T1 is required for rotating the crankshaft 15 by a certain crank angle (such as 180°CA) in this explosion stroke of the first cylinder #1. The elapsed time T2 is required for rotating the crankshaft 15 by a certain crank angle (such as 180°CA) in the explosion stroke of the second cylinder #2 that has been in the explosion stroke in the previous rotation (before 360°CA) compared with the explosion stroke of the first cylinder #1. Subsequently, a rotational fluctuation amount $\Delta NE1$ ($=T1-T2$) of the first cylinder #1 is obtained.

Similarly, the ECU 500 sequentially calculates elapsed times T3 (the third cylinder #3), T4 (the fourth cylinder #4), and T2 (the second cylinder #2) that are required for rotating the crankshaft 15 by a certain crank angle (such as 180°CA) in the respective explosion strokes of the cylinders #2 to #4 of the engine 1 to obtain a rotational fluctuation amount $\Delta NE3$ ($=T3-T1$) of the third cylinder #3, a rotational fluctuation amount $\Delta NE4$ ($=T4-T3$) of the fourth cylinder #4, and a rotational fluctuation amount $\Delta NE2$ ($=T2-T4$) of the second cylinder #2.

The ECU 500 compares the respective rotational fluctuation amounts $\Delta NE1$ to NE4 of the cylinders #1 to #4, which are obtained by the above-described calculation, with the predetermined determination threshold value. In the case where there is any cylinder with the rotational fluctuation amount $\Delta NE$ that exceeds the predetermined determination threshold value, the ECU 500 recognizes (detects) "imbalance abnormality of the air-fuel ratio among the cylinders occurs".

Regarding the determination threshold value set to the rotational fluctuation amount $\Delta NE$, considering a range (an allowable variation degree among cylinders) where the air-fuel ratio imbalance among the cylinders can be absorbed by the air-fuel ratio feedback control, the purification performance of the three-way catalyst (the S/C catalyst 91 and the U/F catalyst 92), and similar parameter, a value (a rotational fluctuation amount) that does not degrade the exhaust emission is obtained by experiment, calculation, or similar method. Based on this result, a compatible value (the determination threshold value) is simply set.

Here, this imbalance detection at the lean side may also be performed based on respective outputs of the first air-fuel ratio sensor 411 and the second air-fuel ratio sensor 412.

OTHER EMBODIMENTS

While in the above-described example where the present invention is applied to an in-cylinder injection type four-cylinder gasoline engine, this should not be construed in a limiting sense. The present invention is applicable to, for example, another gasoline engine with any numbers of cylinders such as a six-cylinder gasoline engine. Additionally, other than the in-cylinder injection type multicylinder gasoline engine, the present invention is applicable to a port-injection type multicylinder gasoline engine or a dual-injection type multicylinder gasoline engine that includes an in-cylinder injection injector and an intake port-injection injector. Furthermore, the present invention is applicable to a gas engine and an engine using biomass-derived fuel.

INDUSTRIAL APPLICABILITY

The present invention is applicable to an internal combustion engine (an engine) including a supercharger. More specifically, the present invention is effectively applicable to a technique for accurately detecting an air-fuel ratio of an exhaust gas at an upstream side of a catalyst of an air-fuel ratio sensor.

DESCRIPTION OF REFERENCE SIGNS 1 engine
1 to #4 cylinder
1d combustion chamber
2 injector (fuel injection valve)
91 S/C catalyst
11 intake passage
12 exhaust passage
120 exhaust port
121 first exhaust manifold (first exhaust passage)
121a and 121b branch pipe
121c branch collecting portion
122 second exhaust manifold (second exhaust passage)
122a and 122b branch pipe
122c branch collecting portion
300 turbocharger
300A turbine
301 turbine wheel
310 turbine housing
311 first exhaust gas inflow port
312 second exhaust gas inflow port
313 partition wall 314 first scroll chamber
315 second scroll chamber
300B compressor
302 compressor impeller
303 coupling shaft
401 crank position sensor
402 cam position sensor
411 first air-fuel ratio sensor (A/F the sensor)
412 second air-fuel ratio sensor (A/F the sensor)
413 oxygen sensor
500 ECU

The invention claimed is:

1. A supercharger-equipped internal combustion engine, comprising:
a first exhaust passage and a second exhaust passage, the first exhaust passage allowing a flow of an exhaust gas discharged from a first cylinder group of an internal combustion engine with a plurality of cylinders, the second exhaust passage allowing a flow of an exhaust gas discharged from a second cylinder group of the internal combustion engine;
a supercharger that includes a turbine and a compressor, the turbine including two exhaust gas inflow ports; and
an electronic control unit,
wherein the first exhaust passage is coupled to one of the exhaust gas inflow ports of the turbine, and the second exhaust passage is coupled to the other exhaust gas inflow port of the turbine,
a collecting portion that is the first exhaust passage at an upstream side of the supercharger where exhaust gas from the first cylinder group is collected and flows and a collecting portion that is the second exhaust passage at an upstream side of the supercharger where exhaust gas from the second cylinder group is collected and flows each include an air-fuel ratio sensor,
wherein the electronic control unit is configured to detect whether or not an air-fuel ratio imbalance among the cylinders occurs based on respective outputs of the air-fuel ratio sensor disposed at the first exhaust passage and the air-fuel ratio sensor disposed at the second exhaust passage, and
the electronic control unit is configured to: detect whether or not an air-fuel ratio imbalance among the cylinders occurs based on output waveforms of the two air-fuel ratio sensors; and detect occurrence of imbalance abnormality when a peak value of the output waveforms is equal to or more than a predetermined determination threshold value.

2. The supercharger-equipped internal combustion engine according to claim 1, wherein
the first exhaust passage is a first exhaust manifold that includes a plurality of branch pipes and a branch collecting portion, the branch pipes being coupled to respective exhaust ports in the first cylinder group, downstream-side end portions of the plurality of branch pipes being coupled to an upstream-side end portion of the branch collecting portion, the branch collecting portion of the first exhaust manifold including the air-fuel ratio sensor, and
the second exhaust passage is a second exhaust manifold that includes a plurality of branch pipes and a branch collecting portion, the branch pipes being coupled to respective exhaust ports in the second cylinder group, downstream-side end portions of the plurality of branch pipes being coupled to an upstream-side end portion of the branch collecting portion, the branch collecting portion of the second exhaust manifold including the air-fuel ratio sensor.

3. A supercharger-equipped internal combustion engine, comprising:
a first exhaust passage and a second exhaust passage, the first exhaust passage allowing a flow of an exhaust gas discharged from a first cylinder group of an internal combustion engine with a plurality of cylinders, the second exhaust passage allowing a flow of an exhaust gas discharged from a second cylinder group of the internal combustion engine and out of the plurality of cylinders, the first cylinder group being made up of a plurality of cylinders whose exhaust stokes are not adjacent to each other, and the second cylinder group being made of a plurality of cylinders whose exhaust strokes are not adjacent to each other;
a supercharger that includes a turbine and a compressor, the turbine including two exhaust gas inflow ports; and
an electronic control unit,
wherein the first exhaust passage is coupled to one of the exhaust gas inflow ports of the turbine, and the second exhaust passage is coupled to the other exhaust gas inflow port of the turbine,
a collecting portion that is the first exhaust passage at an upstream side of the supercharger where exhaust gas from the first cylinder group is collected and flows and a collecting portion that is the second exhaust passage at an upstream side of the supercharger where exhaust gas from the second cylinder group is collected and flows each include an air-fuel ratio sensor,
wherein the electronic control unit is configured to detect whether or not an air-fuel ratio imbalance among the cylinders occurs based on respective outputs of the air-fuel ratio sensor disposed at the first exhaust passage and the air-fuel ratio sensor disposed at the second exhaust passage, and
the electronic control unit is configured to: detect whether or not an air-fuel ratio imbalance among the cylinders occurs based on output waveforms of the two air-fuel ratio sensors; and detect occurrence of imbalance abnormality when a peak value of the output waveforms is equal to or more than a predetermined determination threshold value.

* * * * *